United States Patent
Goeschel et al.

(10) Patent No.: US 10,640,618 B2
(45) Date of Patent: May 5, 2020

(54) POLYURETHANE-POLYISOCYANURATE RESINS FOR FIBER COMPOSITE MATERIALS WITH A LONGER OPEN TIME

(71) Applicant: BASF SE, Ludwigshafen am Rhein (DE)

(72) Inventors: Julia Goeschel, Bremen (DE); Julio Albuerne, Lemfoerde (DE); Rolf Illguth, Diepholz (DE); Margit Gehring, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 120 days.

(21) Appl. No.: 15/576,328

(22) PCT Filed: May 20, 2016

(86) PCT No.: PCT/EP2016/061360
§ 371 (c)(1),
(2) Date: Nov. 22, 2017

(87) PCT Pub. No.: WO2016/193020
PCT Pub. Date: Dec. 8, 2016

(65) Prior Publication Data
US 2018/0148551 A1 May 31, 2018

(30) Foreign Application Priority Data

May 29, 2015 (EP) ..................................... 15169818

(51) Int. Cl.
| | |
|---|---|
| *C08J 5/04* | (2006.01) |
| *C08G 18/58* | (2006.01) |
| *C08G 18/22* | (2006.01) |
| *C08G 18/28* | (2006.01) |
| *C08G 18/32* | (2006.01) |
| *C08G 18/48* | (2006.01) |
| *C08G 18/76* | (2006.01) |

(52) U.S. Cl.
CPC ............ *C08J 5/043* (2013.01); *C08G 18/225* (2013.01); *C08G 18/283* (2013.01); *C08G 18/3206* (2013.01); *C08G 18/4804* (2013.01); *C08G 18/4833* (2013.01); *C08G 18/4854* (2013.01); *C08G 18/58* (2013.01); *C08G 18/7671* (2013.01)

(58) Field of Classification Search
CPC ................ C08G 18/225; C08G 18/283; C08G 18/3206; C08G 18/4804; C08G 18/58; C08G 18/4833; C08G 18/4854; C08G 18/7671; C08J 5/043
See application file for complete search history.

(56) References Cited

U.S. PATENT DOCUMENTS

| 3,883,571 A | 5/1975 | Allport et al. |
|---|---|---|
| 4,229,347 A | 10/1980 | Holt et al. |
| 2003/0065045 A1 | 4/2003 | Falke et al. |
| 2013/0303694 A1* | 11/2013 | Debien ................... C08L 63/00 524/728 |
| 2015/0031527 A1 | 1/2015 | Esbelin et al. |
| 2015/0065611 A1 | 3/2015 | Esbelin et al. |
| 2017/0190080 A1 | 7/2017 | Rischko et al. |
| 2017/0198086 A1 | 7/2017 | Albuerne et al. |
| 2017/0267806 A1 | 9/2017 | Goeschel et al. |

FOREIGN PATENT DOCUMENTS

| EP | 2257580 A2 | 12/2010 |
|---|---|---|
| WO | 0210250 A1 | 2/2002 |
| WO | 2010121898 A1 | 10/2010 |
| WO | 2011107367 A1 | 9/2011 |
| WO | 2012103965 A1 | 8/2012 |
| WO | 2013098034 A1 | 7/2013 |
| WO | 2013143841 A1 | 10/2013 |
| WO | 2015063062 A1 | 5/2015 |
| WO | 2015144435 A1 | 10/2015 |
| WO | 2015189095 A1 | 12/2015 |
| WO | 2016156133 A1 | 10/2016 |
| WO | 2016188774 A1 | 12/2016 |
| WO | 2016188805 A1 | 12/2016 |

OTHER PUBLICATIONS

International Search Report for International Application No. PCT/EP2016/061360, dated Sep. 14, 2016, 2 pages.
International Search Report for International Application No. PCT/EP2016/061360, dated Sep. 14, 2016, 3 pages (German).
European Search Report for EP Patent Application No. 15169818.0, dated Nov. 2, 2015, 2 pages (German).

* cited by examiner

*Primary Examiner* — John E Uselding
(74) *Attorney, Agent, or Firm* — Armstrong Teasdale, LLP

(57) ABSTRACT

A process is disclosed for producing polyurethane-polyisocyanurate-fiber composite parts, wherein a composition comprising polyisocyanate, a mixture obtainable by introducing an alkali metal salt or alkaline earth metal salt into a compound R—NH—CO—R' containing urethane groups, with R' being not hydrogen and/or not COR", a compound containing one or more epoxide groups, polyetherol having an average functionality of 1.8 to 5.0 and a hydroxyl number of 200 to 500, a chain extender, fibrous reinforcing agents and optionally further additives form a reaction mixture. The reaction mixture is applied to the fibrous reinforcing agent and caused to react to form the polyurethane-polyisocyanurate-fiber composite part. Further disclosed is a polyurethane-polyisocyanurate-fiber composite part producible by such a process, and also the use of a polyurethane-polyisocyanurate-fiber composite part as a bodywork component of vehicles, such as bumpers, fenders or roof parts, or as structural or semistructural components for vehicles or wind turbines.

14 Claims, No Drawings

POLYURETHANE-POLYISOCYANURATE RESINS FOR FIBER COMPOSITE MATERIALS WITH A LONGER OPEN TIME

CROSS-REFERENCE TO RELATED APPLICATIONS

This application is a U.S. National Phase Application of PCT/EP2016/061360, filed May 20, 2016, which claims the benefit of priority to EP Application No. 15169818.0, filed May 29, 2015, the contents of which are hereby expressly incorporated by reference in their entirety.

The present invention relates to a process for producing polyurethane-polyisocyanurate-fiber composite parts, wherein (a) polyisocyanate, (b) a mixture obtainable by introducing an alkali metal salt or alkaline earth metal salt into a compound R—NH—CO—R' comprising urethane groups comprise, with R being not hydrogen and/or not COR", (c) compound comprising one or more epoxide groups, and (d) polyetherol having an average functionality of 1.8 to 5.0 and a hydroxyl number of 200 to 500, (e) chain extender, and (f) fibrous reinforcing agents and optionally further additives are mixed to form a reaction mixture, the reaction mixture is applied to the fibrous reinforcing agent and caused to react to form the polyurethane-polyisocyanurate-fiber composite part, the amount of alkali metal ions or alkaline earth metal ions per urethane group in the compound (b) being 0.0001 to 3.5, based on the number of alkali metal or alkaline earth metal ions and urethane groups, the fraction of the compound (c) comprising one or more epoxide groups being from 0.3 to 15 wt %, based on the total weight of components (c) and (d), and the isocyanate index being 200 to 850. The present invention further relates to a polyurethane-polyisocyanurate-fiber composite part producible by such a process, and also to the use of a polyurethane-polyisocyanurate-fiber composite part of this kind as a bodywork component of vehicles, such as bumpers, fenders or roof parts, or as structural or semistructural components for vehicles or wind turbines to be produced, employed.

Especially for the production of fiber composites of large surface area, a system of plastics is needed as the matrix system, having a long open time at constantly low viscosity, so that the reinforcing agents, such as glass or carbon fibers or fiber mats, are fully wetted before the system of plastics cures to give the finished plastic. A further requirement, however, is that the plastics systems cure very rapidly to form the plastic, hence allowing faster cycle times and so increasing the profitability. In general, the long open time is achieved only by epoxide systems or unsaturated polyester systems, which, however, generally require long times for curing.

One means of extending the open time in conjunction with rapid curing of polyurethane systems is to use acid-blocked catalysts. Thus, EP 2257580 describes the use of acid-blocked amine catalysts in polyurethane systems for producing sandwich components. Acid-blocked catalysts, nevertheless, allow the working time to be extended only within the region of minutes. What is required, in contrast, is a working time of up to several hours.

WO 10121898 describes a polyisocyanate component which consists in parts of a urea prepolymer (—NH—CO—NH—) which is bidentate in respect of the anion, this prepolymer having been mixed with lithium chloride. When this component is mixed with a second component, comprising diglycidyl ether and polyol, and this mixture is heated to 80-90° C., there is a rapid reaction which results in full volume curing of the material.

WO 12103965 describes an epoxy-based system which is based on the same catalysis as described in WO 10121898. Here, the groups needed for the catalysis are defined via the two hydrogen atoms located on the nitrogen as a carboxamide group (—CO—NH$_2$), bidentate in respect of the anion, with LiCl.

WO 13098034 comprises a reactive mixture which as well as lithium halide requires a —(—CO—NH—CO—)— group which is bidentate in respect of the cation. The urea component described in this specification may also include polydentate biuret groups (—NH—CO—NH—CO—NH—).

WO 13143841 describes a trimerization catalyst consisting of alkali metal salts or alkaline earth metal salts in combination with carboxamide groups of the structure —CO—NH2, which are bidentate in respect of the anion, or in combination with —(—CO—NH—CO)— groups, which are bidentate in respect of the cation.

Disadvantages of the systems described in WO 10121898, WO 12103965, WO 13098034, and WO 13143841 are that the catalyst blocked with biuret, carbon/late or urea must be added in relatively large quantities in order to have sufficient activity, and that relatively brittle materials are obtained.

It was an object of the present invention, therefore, to supply a polyurethane-polyisocyanurate system for producing polyurethane-polyisocyanurate-fiber composite parts that has a long open time, is able to cure within a few minutes, and exhibits increased catalytic efficacy in comparison to WO 10121898, WO 12103965, WO 13098034, and WO 13143841.

The object according to the invention has been achieved by means of a process for producing polyurethane-polyisocyanurate-fiber composite parts, wherein (a) polyisocyanate, (b) a mixture obtainable by introducing an alkali metal salt or alkaline earth metal salt into a compound R—NH—CO—R' comprising urethane groups comprise with R being not hydrogen and/or not COR", (c) compound comprising one or more epoxide groups, and (d) polyetherol having an average functionality of 1.8 to 3.0 and a hydroxyl number of 200 to 500, (e) chain extender, and (f) fibrous reinforcing agents and optionally further additives are mixed to form a reaction mixture, the reaction mixture is applied to the fibrous reinforcing agent and caused to react to form the polyurethane-polyisocyanurate-fiber composite part, the amount of alkali metal ions or alkaline earth metal ions per urethane group in the compound (b) being 0.0001 to 5.0, based on the number of alkali metal or alkaline earth metal ions and urethane groups, the fraction of the compound (c) comprising one or more epoxide groups being from 0.3 to 15 wt %, based on the total weight of components (c) and (d), and the isocyanate index being 200 to 850.

Polyisocyanates (a) encompass all aliphatic, cycloaliphatic, and aromatic isocyanate known for the preparation of polyurethanes. They preferably have an average functionality of less than 2.5. Examples are 2,2'-, 2,4'-, and 4,4'-diphenylmethane diisocyanate, the mixtures of monomeric diphenylmethane diisocyanates and higher polycyclic homologs of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI), or mixtures thereof.

As polyisocyanates (a), preference is given to using monomeric diphenylmethane diisocyanate, for example 2,2'-diphenylmethane diisocyanate, 2,4'-diphenylmethane diisocyanate, 4,4'-diphenylmethane diisocyanate, or mixtures thereof. Here, diphenylmethane diisocyanate may also be used as a mixture with its derivatives. In that case, diphenylmethane diisocyanate may comprise with particular preference up to 10 wt %, with further particular preference up to 5 wt %, of carbodiimide-, uretdione- or uretonimine-modified diphenylmethane diisocyanate, especially carbodiimide-modified diphenylmethane diisocyanate.

Polyisocyanates (a) may also be used in the form of polyisocyanate prepolymers. These polyisocyanate prepolymers are obtainable by reacting above-described polyisocyanates (constituent (a-1)) in excess, at temperatures for example of 30 to 100° C., preferably at about 80° C., with polyols (constituent (a-2)), to give the prepolymer. The NCO content of polyisocyanate prepolymers of the invention is preferably from 5 to 32 wt % NCO, more preferably from 15 to 28 wt % NCO.

Polyols (a-2) are known to the skilled person and are described for example in "Kunststoffhandbuch, 7, Polyurethane", "Carl Hanser-Verlag, 3rd edition 1993, section 3.1. As polyols, then, it is possible for example to use polyetherols or polyesterols, such as the polyols described under (d) below. Preferred for use as polyols (a-2) are polyols comprising secondary OH groups, such as polypropylene oxide, for example. These polyols (a-2) preferably possess a functionality of 2 to 6, more preferably of 2 to 4, and more particularly 2 to 3. With particular preference the polyols (a-2) comprise polyesterols comprising hydrophobic substances, as described under (b).

It is possible optionally for chain extenders (a-3) to be added to the reaction to form the polyisocyanate prepolymer. Suitable chain extenders (a-3) for the prepolymer are dihydric or trihydric alcohols, examples being dipropylene glycol and/or tripropylene glycol, or the adducts of dipropylene glycol and/or tripropylene glycol with alkylene oxides, preferably dipropylene glycol. Suitable chain extenders are also described under (e).

Polyisocyanate prepolymers of these kinds are described for example in U.S. Pat. No. 3,883,571, WO 02/10250, and U.S. Pat. No. 4,229,347.

Particularly preferred for use as polyisocyanate (a) is diphenylmethane diisocyanate or a polyisocyanate prepolymer based on monomeric 4,4'-diphenylmethane diisocyanate or mixtures of 4,4'-diphenylmethane diisocyanate with its derivatives and polypropylene oxide having a functionality of 2 to 4 and also, optionally, dipropylene glycol or monomeric.

Component (d) comprises preferably less than 0.0001 wt %, based on the total weight of component (d), of alkali metal ions or alkaline earth metal ions. With particular preference the amount of alkali metal or alkaline earth metal ions in component (d) is less than 0.00005, more preferably 0.00003, and more particularly 0.00001 wt %, based on the total weight of component (d).

Components (c) and (d) comprise preferably less than 0.0001 wt %, based on the total weight of components (c) and (d), of alkali metal ions or alkaline earth metal ions. With particular preference the amount of alkali metal or alkaline earth metal ions in components (c) and (d) is less than 0.00005, more preferably 0.00003, and more particularly 0.00001 wt %, based on the total weight of components (c) and (d).

Components (c, (d), and e) comprise with further preference less than 0.0001 wt %, based on the total weight of components (c, d, and e), of alkali metal ions or alkaline earth metal ions. With particular preference the amount of alkali metal or alkaline earth metal ions in components (c, d, and e) is less than 0.00005, more preferably 0.00003, and more particularly 0.00001 wt %, based on the total weight of components (c, d, and e).

Employed as component (b) is a mixture obtainable by introducing an alkali metal salt or alkaline earth metal salt into a compound comprising urethane groups.

The alkali metal salt or alkaline earth metal salt used in this context is a compound which accelerates the reaction between isocyanates (a), the compounds (c) comprising one or more epoxide groups, and optionally polyols (d). These compounds encompass, in particular, salts of sodium, lithium, magnesium, and potassium, and ammonium compounds, preferably lithium or magnesium, with any desired anions, preferably with anions of organic acids such as carboxylates and more preferably of inorganic acids, such as nitrates, halides, sulfates, sulfites, and phosphates, more preferably still with anions of monoprotic acids, such as nitrates or halides, and especially nitrates, chlorides, bromides or iodides. Particular preference is given to using lithium chloride, lithium bromide, and magnesium dichloride, and especially lithium chloride. Alkali metal or alkaline earth metal salts of the invention can be used individually or as mixtures.

Apart from the alkali metal or alkaline earth metal salt, there are preferably no further compounds used that accelerate the reaction of isocyanates with groups that are reactive toward isocyanates.

Compound comprising urethane groups is understood to be any desired compounds which are liquid or solid at 20° C. and comprise at least one urethane group R—NH—CO—R', in which R is not hydrogen and/or is not COR". The compound comprising urethane groups in component (b) here is preferably obtainable by reaction from a second polyisocyanate and a compound having at least one OH group. Preference here is given to compounds which are liquid at 50° C., and more preferably those which are liquid at room temperature. A substance or component which is "liquid" in the context of the present invention means one which at the specified temperature has a viscosity of not more than 10 Pas. Where no temperature is specified, the datum is based on 20° C. Measurement in this context takes place according to ASTM D445-11. The compounds comprising urethane groups preferably have at least two urethane groups. The molecular weight of these compounds comprising urethane groups is preferably in the range from 200 to 15 000 g/mol, more preferably 300 to 10 000 g/mol, and more particularly 500 to 1300 g/mol. Compounds comprising urethane groups may be obtained, for example, by reaction of aforementioned isocyanates (a1) as second isocyanate with compounds which have at least one hydrogen atom that is reactive toward isocyanates, such as alcohols, examples being monoalcohols, such as methanol, ethanol, propanol, butanol, pentanol, hexanol, or longer-chain propoxylated or ethoxylated monools, such as poly(ethylene oxide) monomethyl ether, such as, for example, the monofunctional Pluriol® products from BASF, dialcohols, such as ethylene glycol, diethylene glycol, triethylene glycol, propylene glycol, dipropylene glycol, butanediol, hexanediol, and/or reaction products of said isocyanates with the below-described polyols (d) and/or chain extenders (e)—individually or in mixtures. To prepare the compound comprising urethane groups it is possible to employ not only isocyanates but also polyols in a stoichiometric excess. Where monoalcohols are used, isocyanate groups and OH groups may also be used in a stoichiometric ratio. Where the compound comprising urethane groups has two or more isocyanate groups per molecule, they may wholly or partly replace the polyisocyanates (a). Reaction takes place customarily at temperatures between 20 and 120° C., for example at 80° C. The second isocyanate, used for preparing the compound comprising urethane groups, is preferably an isomer or homolog of diphenylmethane diisocyanate. More preferably the second isocyanate is monomeric diphenylmethane diisocyanate, for example 2,2'-diphenylmethane diisocyanate, 2,4'-diphenylmethane diisocyanate, 4,4'-diphenylmethane diisocyanate, or a mixtures thereof. This diphenylmethane diisocyanate may also be used as a mixture with its derivatives. In that case, diphenylmethane diisocyanate may with particular preference comprise up to 10 wt %, with further particular preference up to 5 wt %, of carbodiimide-, uretdione-, or uretonimine-modified diphenylmethane diisocyanate, especially carbodiimide-modified diphenylmethane diisocyanate. In a particularly preferred embodiment, the first isocyanate (a) and the second isocyanate for preparing the compound comprising urethane groups are identical.

The compound comprising urethane groups may also be obtained via alternative reaction pathways, as for example by reacting a carbonate with a monoamine to form a urethane group. For this purpose, for example, a propylene carbonate is reacted in a slight excess (1.1 eq) with a monoamine, e.g., a Jeffamin M 600, at 100° C. The resulting urethane may likewise be used as a compound comprising urethane group.

The mixtures comprising the alkali metal or alkaline earth metal salts and a compound comprising urethane groups may be obtained, for example, by mixing the alkali metal or alkaline earth metal salt into the compound comprising urethane groups, at room temperature or at elevated temperature, for example. This may be done using any mixer, such as a single stirrer, for example. The alkali metal or alkaline earth metal salt in this case may be used as a pure substance or in the form of a solution, in mono- or polyfunctional alcohols, for example, such as methanol, ethanol, or chain extender (e), or water. In one particularly preferred embodiment, commercially available prepolymer-based isocyanate is admixed directly with the dissolved salt. Suitable for this purpose for example are isocyanate prepolymers having an NCO content of 15% to 30%, based in particular on diphenylmethane diisocyanate and a polyether polyol. Isocyanates of this kind are available commercially for example from BASF under the trade name Lupranat® MP 102.

In one particularly preferred embodiment of the present invention, the alkali metal or alkaline earth metal salt is dissolved in a compound having hydrogen atoms that are reactive toward isocyanate, and this solution is subsequently mixed with the isocyanate, optionally at elevated temperature.

Particular preference is given to preparing the compound comprising urethane groups using a monool having a molecular weight of 30 to 15 000 g/mol, preferably 100 to 900 g/mol and, in a particularly preferred version, of 400 to 600 g/mol.

The amount of alkali metal or alkaline earth metal ions per urethane group in the compound (b) is 0.0001 to 3.5, preferably 0.01 to 1.0, more preferably 0.05 to 0.9, and more particularly 0.1 to 0.8, based in each case on the number of alkali metal or alkaline earth metal ions and urethane groups (per equivalent of urethane groups).

The amount of alkali metal or alkaline earth metal ions per isocyanate group in the first polyisocyanate (a) and also, if present, in the complex compound (b) is preferably 0.0001 to 0.3, more preferably 0.0005 to 0.02 and more particularly 0.001 to 0.01 equivalent, based in each case on the number of alkali metal or alkaline earth metal ions and urethane groups.

Between the alkali metal or alkaline earth metal salt in the mixture (b), preferably at 25° C., there is a thermally reversible interaction with the compounds comprising urethane groups, as component (b), whereas at temperatures greater than 50° C., preferably from 60 to 200° C. and more particularly from 80 to 200° C., the catalytically active compound is in free form. For the purposes of the invention, a thermally reversible interaction is assumed when the open time of the reaction mixture at 25° C. is longer by a factor of at least 5, more preferably at least 10 and more particularly at least 20, than at 80° C. The open time here is defined as the time within which the viscosity of the reaction mixture increases at constant temperature to an extent such that the required stirring force exceeds the given stirring force of the Shyodu Gel Timer, model 100, version 2012. For this purpose, 200 g in each case of reaction mixture were prepared, were mixed in a Speedmixer at 1950 rpm for 1 minute, and 130 g of the mixture, at room temperature or elevated reaction temperature in an oven, in a PP beaker with a diameter of 7 cm, were stirred using a Shyodu Gel Timer, model 100, version 2012 and an associated wire stirrer, at 20 rpm, until the viscosity and hence the required stirring force for the reactive mixture exceeded the stirring force of the Gel Timer.

As compound (c) comprising one or more epoxide groups it is possible to use all epoxide-comprising compounds which are commonly used for the preparation of epoxy resins. The compound (c) comprising epoxide groups are preferably liquid at 25° C. Here it is also possible to use mixtures of such compounds, which are preferably likewise liquid at 25° C.

Examples of such compounds comprising epoxide groups that can be used in the context of the invention are I) Polyglycidyl and poly([beta]-methylglycidyl) esters, obtainable by reacting a compound having at least two carboxyl groups in the molecule with in each case epichlorohydrin and [beta]-methylepichlorohydrin. This reaction is advantageously catalyzed by the presence of bases.

Aliphatic polycarboxylic acids may be used, for example, as a compound having at least two carboxyl groups. Examples of such aliphatic polycarboxylic acids are oxalic acid, succinic acid, glutaric acid, adipic acid, pimelic acid, suberic acid, azelaic acid and dimerized or trimerized linoleic acid. Additionally it is possible for cyclic, aliphatic acids to be used as well, such as tetrahydrophthalic acid, 4-methyltetrahydrophthalic acid, hexahydrophthalic acid or 4-methylhexahydrophthalic acid. Aromatic carboxylic acids too, such as phthalic acid, isophthalic acid or terephthalic acid, and also any desired mixtures of these carboxylic acids, may be used.

II) Polyglycidyl or poly([beta]-methylglycidyl) ethers, obtainable by reaction of a compound having at least two alcohol hydroxyl groups and/or phenolic hydroxyl groups with epichlorohydrin or [beta]-methylepichlorohydrin under alkaline conditions or in the presence of an acidic catalyst, and subsequent treatment with a base.

The glycidyl ethers of this type are derived for example from linear alcohols, such as ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycol, pentane-1,5-diol, hexane-1,6-diol, hexane-2,4,6-triol, glycerol, 1,1,1-trimethylolpropane, pentaerythritol or sorbitol, and from polyepichlorohydrins.

Further glycidyl ethers of this type are obtainable from cycloaliphatic alcohols, such as 1,4-cyclohexanedimethanol, bis(4-hydroxycyclohexyl)methane or 2,2-bis(4-hydroxycyclohexyl)propane, or from alcohols which carry aromatic groups and/or other functional groups, such as N,N-bis(2-hydroxyethyl)aniline or p,p'-bis(2-hydroxyethylamino)diphenylmethane.

The glycidyl ethers may also be based on monocyclic phenols, such as p-tert-butylphenol, resorcinol or hydroquinone, or on polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further compounds comprising hydroxyl groups and suitable for the preparation of the glycidyl ethers are novolacs, obtainable by condensing aldehydes, such as formaldehyde, acetaldehyde, chloraldehyde or furfuraldehyde, with phenols or bisphenols, which may be unsubstituted or substituted, by chlorine atoms or C1 to C9 alkyl groups, for example, such as phenol, 4-chlorophenol, 2-methylphenol or 4-tert-butylphenol.

III) Poly(N-glycidyl) compounds, obtainable by dehydrochlorination of reaction products of epichlorohydrin with amines comprising at least two amine-bonded hydrogen atoms. Such amines are, for example, aniline, n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of cycloalkyleneureas, like ethyleneurea or 1,3-propyleneurea, and diglycidyl derivatives of hydantoins, like 5,5-dimethylhydantoin.

IV) Poly(S-glycidyl) compounds, such as di-S-glycidyl derivatives, which are obtainable from dithiols, for example ethane-1,2-dithiol or bis(4-mercaptomethylphenyl) ether.

V) Cycloaliphatic epoxy resins, such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

VI) Monofunctional epoxy resins, such as 2-ethylhexyl glycidyl ether, isopropyl glycidyl ether, butyl glycidyl ether or cresyl glycidyl ether.

In the context of the invention it is likewise possible to use epoxy resins wherein the 1,2-epoxy group is bonded to different heteroatoms or functional groups. These compounds include N,N,O-triglycidyl derivatives of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Particularly preferred as component (c) are the compounds of classes (I) and (II), more particularly those of class (II).

The compound (c) comprising one or more epoxide groups is used preferably in an amount of 0.3 to 15 wt/0, preferably 0.5 to 10 wt % and more particularly 0.8 to 5 wt/0, based on the total weight of components (c) and (d).

The amount of alkali metal or alkaline earth metal ions per epoxy group is preferably greater than 0.00001 and is more preferably 0.00005 to 0.3, based in each case on the number of alkali metal or alkaline earth metal ions and epoxy groups.

As polyetherol having an average functionality of 1.8 to 5.0, preferably 1.9 to 4.8 and more preferably 1.95 to 4.4 and a hydroxyl number of 200 to 700, preferably 300 to 650 and more particularly 320 to 450 mg KOH/g, it is possible to use customary polyetherols featuring these parameters. As isocyanate-reactive groups there may be groups such as OH, SH and NH groups present. The polyols preferably have substantially OH groups, more preferably exclusively OH groups, as isocyanate-reactive groups. In one preferred embodiment the polyols have at least 40%, preferably at least 60%, more preferably at least 80% and more particularly at least 95% of secondary OH groups, based on the number of isocyanate-reactive groups. In a further preferred embodiment, the polyols have at least 60%, more preferably at least 80% and more particularly at least 95% of primary OH groups, based on the number of isocyanate-reactive groups. The calculation of the average OH number and also the average functionality here is made on the basis of all polyetherols used.

The polyetherols are obtained in the presence of catalysts by known methods, as for example by anionic polymerization of alkylene oxides with addition of at least one starter molecule, comprising 2 to 4, preferably 2 to 3 and more preferably 2 reactive hydrogen atoms in bound form. Catalysts used may be alkali metal hydroxides, such as sodium or potassium hydroxide, or alkali metal alkoxides, such as sodium methoxide, sodium or potassium ethoxide or potassium isopropoxide, or Lewis acids in the case of cationic polymerization, such as antimony pentachloride, boron trifluoride etherate or bleaching earth as catalysts. As catalysts it is additionally possible to use double metal cyanide compounds, known as DMC catalysts. For polyetherols having hydroxyl numbers >200 mg KOH/g, a tertiary amine, such as imidazole, for example, may also be employed as catalyst. Such polyols are described for example in WO 2011/107367.

As alkylene oxides, use is made preferably of one or more compounds having 2 to 4 carbon atoms in the alkylene radical, such as tetrahydrofuran, 1,2-propylene oxide, or 1,2- and/or 2,3-butylene oxide, in each case alone or in the form of mixtures, and preferably 1,2-propylene oxide, 1,2-butylene oxide and/or 2,3-butylene oxide, especially 1,2-propylene oxide.

Starter molecules contemplated include, for example, ethylene glycol, diethylene glycol, glycerol, trimethylolpropane, pentaerythritol, sucrose, methylamine, ethylamine, isopropylamine, butylamine, benzylamine, aniline, toluidine, toluenediamine, naphthylamine, ethylenediamine, diethanolamine, triethanolamine, and also other, especially dihydric alcohols.

For modifying the mechanical properties, such as the hardness, it may prove advantageous to add chain extenders, crosslinking agents or else, optionally, mixtures of these. In the case of the production of a composite material of the invention, a chain extender (e) may be used. However, it is also possible to do without the chain extender (e).

Where low molecular weight chain extenders (e) are used, it is possible to use chain extenders known in connection with the preparation of polyurethanes. These are, preferably, aliphatic and cycloaliphatic and/or araliphatic or aromatic diols and optionally triols having 2 to 14, preferably 2 to 10, carbon atoms, such as ethylene glycol, 1,3-propanediol, 1,4-butanediol, 1,6-hexanediol, 1,10-decanediol and bis(2-hydroxyethyl)hydroquinone, 1,2-, 1,3- and 1,4-dihydroxycyclohexane, diethylene glycol, dipropylene glycol, tripropylene glycol, triols, such as 1,2,4- and 1,3,5-trihydroxycyclohexane, glycerol and trimethylolpropane.

Preferably, in addition to the polyetherol (d) and the chain extenders (e), less than 50 wt %, particularly preferably less than 30 wt %, more preferably less than 10 wt % and in particular no further compounds are used that have isocyanate-reactive hydrogen atoms, such as polyesters or poly-carbonate diols, based on the total weight of polyether (d), chain extender (e) and the further compounds having isocyanate-reactive hydrogen atoms.

Fibrous reinforcing agents (f) used for the purposes of the invention are fibers, such as glass fibers, aramid fibers, carbon fibers or fibers made of plastic. Reinforcing agents of these kinds are known and are commonly used in the production of fiber-reinforced plastics. The fibrous reinforcing agents are preferably used in plies. Such fiber plies are obtained, for example, by linking together individual fibers. In one preferred embodiment, the fibrous reinforcing agents consist of laid scrims, woven fabrics or knitted fabrics based on glass fibers, aramid fibers, carbon fibers or fibers made of plastic. Reinforcing-agent plies of these kinds are known and are available commercially. Glass fiber mats are employed in particular.

Further it is possible to use additives for water adsorption. Preferred additives for water adsorption that are used are aluminosilicates, selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates and mixtures thereof. Particular preference is given to using mixtures of sodium, potassium and calcium aluminosilicates in a castor oil vehicle.

The additive for water absorption preferably has an average particle size of not greater than 200 μm, more preferably not greater than 150 μm and in particular not greater than 100 μm. The pore size of the additive of the invention for water absorption is preferably 2 to 5 angstroms. Besides the inorganic additives for water adsorption, it is also possible to use known organic additives for water adsorption, such as orthoformates, an example being triisopropyl orthoformate.

If an additive for water absorption is added, this is preferably in amounts greater than one part by weight, more preferably in the range from 1.2 to 2 parts by weight, based on the total weight of the polyisocyanurate system.

If polyurethane foams are to be produced, it is also possible, instead of water scavengers, to use chemical and/or physical blowing agents that are customary within polyurethane chemistry. Chemical blowing agents are understood to be compounds which as a result of reaction with isocyanate form gaseous products, such as water or formic acid, for example. Physical blowing agents are understood to be compounds which are present in solution or emulsion in the ingredients of polyurethane preparation and which evaporate under the conditions of polyurethane formation. Examples are hydrocarbons, halogenated hydrocarbons, and other compounds, such as, for example, perfluorinated alkanes, such as perfluorohexane, fluorochlorohydrocarbons, and ethers, esters, ketones, acetals or mixtures thereof, as for example (cyclo)aliphatic hydrocarbons having 4 to 8 carbon atoms, or hydrofluorocarbons, such as Solkane® 365 mfc from Solvay Fluorides LLC. With preference no blowing agent is added.

Flame retardants which can be used are, in general, the flame retardants known from the prior art. Examples of suitable flame retardants are brominated ethers (Ixol B 251), brominated alcohols, such as dibromoneopentyl alcohol, tribromoneopentyl alcohol and PHT-4 diol, and also chlorinated phosphates, such as, for example, tris(2-chloroethyl) phosphate, tris(2-chloroisopropyl) phosphate (TCPP), tris(1, 3-dichloroisopropyl) phosphate, tris(2,3-dibromopropyl) phosphate and tetrakis(2-chloroethyl)ethylene diphosphate, or mixtures thereof.

Besides the halogen-substituted phosphates already stated, it is also possible for inorganic flame retardants, such as red phosphorus, preparations comprising red phosphorus, expandable graphite, aluminum oxide hydrate, antimony trioxide, arsenic oxide, ammonium polyphosphate and calcium sulfate, or cyanuric acid derivatives, such as melamine, or mixtures of at least two flame retardants, such as ammonium polyphosphates and melamine, and also, optionally, starch, to be used in order to impart flame retardancy to the rigid polyurethane foams produced in accordance with the invention.

As further liquid, halogen-free flame retardants it is possible to use diethyl ethanephosphonate (DEEP), triethyl phosphate (TEP), dimethyl propylphosphonate (DMPP), diphenyl cresyl phosphate (DPK) and others.

In the context of the present invention, the flame retardants are used preferably in an amount of 0 to 60 wt %, more preferably of 5 to 50 wt %, more particularly of 5 to 40 wt %, based on the total weight of components (b) to (e).

Internal release agents which can be used are all release agents customary in the preparation of polyurethanes, examples being metal salts in solution in diamine, such as zinc stearate, and derivatives of polyisobutylenesuccinic acid. It is also possible to use further additives customary within polyurethane chemistry, such as stabilizers, UV absorbers or antioxidants.

A polyurethane system of the invention preferably comprises less than 0.5 wt %, more preferably less than 0.3 wt %, of water, based on the total weight of components (b) to (e).

The polyurethanes of the invention are prepared by mixing components (a) to (d) and optionally (e) and (f) to form a reaction mixture, applying the reaction mixture to the fibrous reinforcing agent, and completing reaction polyurethane-polyisocyanurate-fiber composite part. For the purposes of the invention here, the mixture of components (a) to (f) is referred to as a reaction mixture at reaction conversions of less than 90%, based on the isocyanate groups. Individual components may already have been premixed. Thus, for example, polyisocyanates (a) and the mixture obtainable by introducing an alkali metal or alkaline earth metal salt into a compound (b) comprising urethane groups may be premixed, provided that component (b) comprises no isocyanate-reactive groups. Likewise, components (c), (d), (e) and (f) may be premixed. If component (b) comprises no isocyanate groups, component (b) as well can be added to this mixture.

Reaction mixtures of the invention have a long open time at 25° C., of more than 60 minutes for example, preferably of more than 90 minutes and more preferably of more than 120 minutes. The open time here is determined as described above, via the increase in viscosity. Raising the temperature to temperatures greater than 60° C., preferably 70 to 120° C., more preferably to 70 to 100° C., and especially 75 to 95° C., cures the reaction mixture of the invention rapidly, in less than 50 minutes, for example, preferably in less than 30 minutes, more preferably in less than 20 minutes, and more particularly in less than 10 minutes. Curing of a reaction mixture of the invention refers, for the purposes of the invention, to the increase from the initial viscosity to ten times the initial viscosity. The difference between the open time at 25° C. and the open time at 80° C. here is preferably at least 40 minutes, more preferably at least an hour and very preferably at least 2 hours.

The isocyanate index for a process of the invention is in the range from 200 to 850, preferably 200 to 650, more preferably 200 to 450, very preferably 250 to 450 and more particularly 280 to 450. The isocyanate index in the context of the present invention refers to the stoichiometric ratio of isocyanate groups to isocyanate-reactive groups, multiplied by 100. Isocyanate-reactive groups are all groups reactive with isocyanate that are present in the reaction mixture, including chemical blowing agents and compounds having epoxide groups, but not the isocyanate group itself.

With the process of the invention, preferably, a compact material is obtained; in other words, no blowing agent is added. Small amounts of blowing agent, for example small amounts of water which condense into the reaction mixture or the starting components in the course of processing, via atmospheric humidity, are not included in the last statement. A compact polyurethane-polyisocyanurate-fiber composite part refers to a polyurethane-polyisocyanurate-fiber composite part which is substantially free from gas inclusions. The density of a compact polyurethane-polyisocyanurate-fiber composite part is preferably greater than 0.8 g/cm$^3$, more preferably greater than 0.9 g/cm$^3$ and more particularly greater than 1.0 g/cm$^3$, without taking into consideration the proportion of fibers.

Apart from the alkali metal or alkaline earth metal salt used in component (b), there are preferably no compounds used in the process of the invention for accelerating the isocyanate-polyol reaction, and in particular none of the usual polyurethane catalysts based on compounds having tertiary amine groups. The polyurethane-polyisocyanurate-fiber composite parts of the invention are notable for outstanding mechanical properties, which can be varied within wide limits.

The process of the invention permits excellent wetting without defects, and rapid curing at 70 to 150° C., preferably 70 to 100° C. and more particularly 75 to 95° C. The polyurethane-polyisocyanurate-fiber composite moldings obtained possess outstanding mechanical properties and a very good surface.

A further subject of the present invention is the polyurethane-polyisocyanurate-fiber composite part obtainable by a process of the invention, and the use of a polyurethane-polyisocyanurate-fiber composite part of the invention for producing a large number of composite materials, for example in resin transfer molding (RTM), resin injection molding (RIM) or structural reaction injection molding (SRIM), for the production, for example, of bodywork components for vehicles, door or window frames or honeycomb-reinforced components, or in vacuum-assisted resin infusion, for production, for example, of structural or semistructural components for vehicles or wind turbines. The vacuum-assisted resin infusion taking place may be the infusion of fibrous reinforcing agents in a closed mold, known as the RTM process, and preferably in an open mold, known as vacuum infusion.

The composite materials with the polyurethane-polyisocyanurate-fiber composite part produced in accordance with the invention may be used, furthermore, for production—mass production, for example—of parts for vehicles, components for trains, air travel and space travel, marine applications, wind turbines, structural components, adhesives, packaging, encapsulating materials and insulators. The polyurethane-polyisocyanurate-fiber composite part produced by a process of the invention is used preferably for producing structural or semistructural components for wind turbines, vehicles, such as bumpers, fenders or roof parts, and marine applications, such as rotor blades, spiral springs or ship's bodies. Structural components here are understood to be those obtained using long fibers with an average fiber length of more than 10 cm, preferably more than 50 cm, while semistructural components are understood to be those obtained using short fibers having an average fiber length of less than 10 cm, preferably less than 5 cm.

In the text below, the present invention is illustrated using examples:

Starting Materials

| | |
|---|---|
| Polyol 1 | Sucrose/glycerol-started polyether polyol with propylene glycol, a functionality of 4.3, and an OH number of 490 mg KOH/g. |
| Polyol 2 | Polypropylene oxide, functionality = 2, OHN = 250 mg KOH/g |
| GDE 1 | Bisphenol A-based diglycidyl ether, e.g. Araldite GY 250 from Huntsman |
| ZM1 | Zeolite-based water scavenger |
| ZM2 | Defoamer |
| ZM3 | Reaction product consisting of Iso 3 with a monofunctional polyethylene oxide having a number-average molecular weight of 500 g/mol, available under the tradename "Pluriol ® A 500 E" from BASF |
| Cat 1 | Mixture of LiCl and ZM3, 0.50 eq LiCl based on number of urethane bonds in ZM3 |
| Cat 2 | Noninventive mixture of LiCl and urea prepolymer, obtainable by reacting Jeffamin M600 and Iso 3 and also 0.70 eq LiCl, based on number of urea bonds in the prepolymer, as described correspondingly in WO10121898. |
| Cat 3 | Potassium acetate |
| Cat 4 | N,N',N'-Trisdimethylaminopropylhexahydrotrianzine |
| Cat 5 | 1,8-Diazabicyclo[5.4.0]undec-7-ene (DBU) |
| Cat 6 | Blocked 1,8-diazabicyclo[5.4.0]undec-7-ene, blocked phenolically |
| Iso 1 | Diphenylmethane diisocyanate (MDI) with higher polycyclic homologs, NCO content 31.5% |
| Iso 2 | Mixture of 2,4'-MDI and 4,4'-MDI |
| Iso 3 | Carbodiimide-modified 4,4'-diphenylmethane diisocyanate (MDI), NCO content 29.5% |

Preparation of ZM3: the monool was charged to a glass flask and the isocyanate was added with vigorous stirring by means of a magnetic stirrer. Throughout the synthesis the temperature was monitored by temperature sensor. Heating then took place to 70° C. until reaction commenced. Where the reaction heated up by itself, cooling took place with an ice bath; where the reaction was relatively slow, the temperature was raised further to 90° C. with stirring for a further 30 minutes. After the end of the reaction, the reaction mixture was cooled to room temperature. A solid or a viscous oil was obtained, depending on the molecular weight of the monool used.

Preparation of Cat 1: ZM3 was mixed with the corresponding quantity of LiCl, in solution in ethanol, and this mixture was heated to 70° C. and stirred at that temperature for 30 minutes. The reaction mixture was then cooled, and excess ethanol was stripped off on a rotary evaporator.

According to table 1, the polyols, additives ZM1 and 2 and, if present, GDE and catalysts 2 to 5 were premixed to form a polyol component, and isocyanates 1 and 2 and also Cat 1 were premixed to form an isocyanate component. Polyol component and isocyanate component were then mixed in a Speedmixer at 800 rpm for 1 minute, at room temperature, at an isocyanate index of 300. After that the open time (OT) was determined using the Shyodu Gel Timer, model 100, version 2012 at 25° C. and at 80° C.

TABLE 1

|  | R1 | I1 | I2 | C1 | C2 | C3 | C4 | C5 | C6 | C7 | C8 | C9 |
|---|---|---|---|---|---|---|---|---|---|---|---|---|
| Polyol 1 | 42 | 42 | 42 | 42 | 42 | 42 | 42 | 42 | 42 | 42 | 42 | 42 |
| Polyol 2 | 55 | 55 | 55 | 55 | 55 | 55 | 55 | 55 | 55 | 55 | 55 | 55 |
| ZM1 | 2.9 | 2.9 | 2.9 | 2.9 | 2.9 | 2.9 | 2.9 | 2.9 | 2.9 | 2.9 | 2.9 | 2.9 |
| ZM2 | 0.1 | 0.1 | 0.1 | 0.1 | 0.1 | 0.1 | 0.1 | 0.1 | 0.1 | 0.1 | 0.1 | 0.1 |
| GDE |  | 1 | 3 | 1 | 3 |  |  |  |  |  |  |  |
| Cat 3 |  |  |  |  |  | 0.12 | 0.05 |  |  |  |  |  |
| Cat 4 |  |  |  |  |  |  |  | 0.05 | 0.1 | 0.2 |  |  |
| Cat 5 |  |  |  |  |  |  |  |  |  |  | 0.4 |  |
| Cat 6 |  |  |  |  |  |  |  |  |  |  |  | 0.8 |
| Iso 1 | 40 | 40 | 40 | 40 | 40 | 40 | 40 | 40 | 40 | 40 | 40 | 40 |
| Iso 2 | 60 | 60 | 60 | 60 | 60 | 60 | 60 | 60 | 60 | 60 | 60 | 60 |
| Cat 1 |  | 1.5 | 1.5 |  |  |  |  |  |  |  |  |  |
| Cat 2 |  |  |  | 1.5 | 1.5 |  |  |  |  |  |  |  |
| Index | 300 | 300 | 300 | 300 | 300 | 300 | 300 | 300 | 300 | 300 | 300 | 300 |
| MR | 240 | 240 | 240 | 240 | 240 | 240 | 240 | 240 | 240 | 240 | 240 | 240 |
| OT 25° C. (min) | >360 | 360 | 291.5 | >360 | >360 | 11.5 | 37.2 | 83 | 36.9 | 13.6 | 99 | 65 |
| OT 80° C. (min) | >60 | 17 | 13.7 | 22 | 19 | 3.3 | 8.8 | 66.8 | 7.6 | 6.3 | 6.6 | 5.3 |

The table shows that even small quantities of diglycidyl ether and catalyst 1 mean that curing at 80° C. is accelerated significantly relative to the reference example without catalyst and without diglycidyl ether, whereas the open time at room temperature remains essentially unchanged. This cannot be achieved using conventional catalysts. If catalyst 2 is used, the open time at room temperature is likewise very long, but the open time at 80° C. is much slower than for inventive catalysts.

In accordance with the composition of I1 and I2, plates were produced and the glass transition temperature is determined after the 2nd heating. This temperature was 81° C. and 192° C. for I1, and was 86 and 206° C. for C1.

What is claimed is:

1. A process for producing polyurethane-polyisocyanurate-fiber composite parts, wherein
   component (a) polyisocyanate,
   component (b) a mixture comprising an alkali metal salt or alkaline earth metal salt and a compound comprising urethane groups obtained by reaction of:
   (i) a polyisocyanate selected from the group consisting of 2,2'-diphenylmethane diisocyanate; 2,4'-diphenylmethane diisocyanate; 4,4'-diphenylmethane diisocyanate; mixtures of monomeric diphenylmethane diisocyanates and polymeric diphenylmethane diisocyanate; isophorone diisocyanate or its oligomers; 2,4-tolylene diisocyanate, 2,6-tolylene diisocyanate, and mixtures thereof; tetramethylene diisocyanate and its oligomers; hexamethylene diisocyanate and its oligomers; naphthylene diisocyanate; and mixtures thereof, with
   (ii) a monoalcohol, a dialcohol, or a polyol,
   component (c) a compound containing one or more epoxide groups, and
   component (d) a polyetherol having an average functionality of 1.8 to 5.0 and a hydroxyl number of 200 to 500,
   component (e) a chain extender, and
   component (f) at least one fibrous reinforcing agent
   are mixed to form a reaction mixture, the reaction mixture is applied to the at least one fibrous reinforcing agent and caused to react to form the polyurethane-polyisocyanurate-fiber composite part, the amount of alkali metal ions or alkaline earth metal ions per urethane group in the component (b) being 0.0001 to 3.5, based on the number of alkali metal or alkaline earth metal ions and urethane groups, the fraction of the component (c) containing one or more epoxide groups being from 0.3 to 15 wt %, based on the total weight of components (c) and (d), and an isocyanate index being 200 to 850.

2. The process according to claim 1, wherein the isocyanate index is 200 to 450.

3. The process according to claim 1, wherein the component (a) is a polyisocyanate prepolymer having an NCO content of 5 to 33 wt %.

4. The process according to claim 1, wherein an amount of alkali metal ions or alkaline earth metal ions per isocyanate group in the component (a) and also in the component (b) is 0.0001 to 0.3, based on a number of alkali metal or alkaline earth metal ions and isocyanate groups.

5. The process according to claim 1, wherein the compound containing one or more epoxide groups in component (c) comprises two or more epoxide groups per molecule.

6. The process according to claim 1, wherein the alkali metal salt or alkaline earth metal salt in component (b) is lithium chloride.

7. The process according to claim 1, wherein the compounds containing one or more epoxide groups in component (c) are used in an amount such that an equivalents ratio of epoxide group to isocyanate group in the polyisocyanate in component (a) is 0.1 to 2.0.

8. The process according to claim 1, further comprising mixing components (a), (b), (c), (d), (e), and (f) with component (g) additives to form the reaction mixture.

9. The process according to claim 1, wherein the compounds containing one or more epoxide groups in component (c) are used in an amount such that an equivalents ratio of epoxide group to isocyanate group in the polyisocyanates in component (a) and isocyanate groups present in the component (b) is 0.1 to 2.0.

10. The process according to claim 1, wherein the polyisocyanate is selected from the group consisting of 2,2'-diphenylmethane diisocyanate; 2,4'-diphenylmethane diisocyanate; 4,4'-diphenylmethane diisocyanate, and mixtures thereof.

11. The process according to claim 1, wherein the monoalcohol is selected from the group consisting of methanol, ethanol, propanol, butanol, pentanol, hexanol, poly(ethylene oxide) monomethyl ether, and mixtures thereof.

12. The process according to claim 1, wherein the dialcohol is selected from the group consisting of ethylene glycol, diethylene glycol, triethylene glycol, propylene glycol, dipropylene glycol, butanediol, hexanediol, and mixtures thereof.

13. The process according to claim 1, wherein the polyol is selected from the group consisting of polyetherols, polyesterols, and mixtures thereof.

14. The process according to claim 13, wherein the polyol is polypropylene oxide.

\* \* \* \* \*